United States Patent
Bessems

(10) Patent No.: US 10,620,290 B1
(45) Date of Patent: Apr. 14, 2020

(54) INDOOR POSITIONING SYSTEM

(71) Applicant: IDEAL Industries Lighting LLC, Sycamore, IL (US)

(72) Inventor: Ronald W. Bessems, Santa Barbara, CA (US)

(73) Assignee: IDEAL Industries Lighting LLC, Sycamore, IL (US)

(*) Notice: Subject to any disclaimer, the term of this patent is extended or adjusted under 35 U.S.C. 154(b) by 0 days.

(21) Appl. No.: 16/279,471

(22) Filed: Feb. 19, 2019

(51) Int. Cl.
| | |
|---|---|
| *G01S 1/02* | (2010.01) |
| *G06N 3/08* | (2006.01) |
| *H04W 4/029* | (2018.01) |
| *F21V 23/00* | (2015.01) |
| *H04B 17/11* | (2015.01) |
| *H04W 4/33* | (2018.01) |
| *G01S 11/06* | (2006.01) |
| *H04W 4/80* | (2018.01) |
| *H04B 17/318* | (2015.01) |

(52) U.S. Cl.
CPC .............. *G01S 1/024* (2013.01); *F21V 23/00* (2013.01); *G01S 11/06* (2013.01); *G06N 3/08* (2013.01); *H04B 17/11* (2015.01); *H04B 17/318* (2015.01); *H04W 4/029* (2018.02); *H04W 4/33* (2018.02); *H04W 4/80* (2018.02)

(58) Field of Classification Search
CPC ......... H04W 4/33; H04W 4/029; H04W 4/80; G01S 1/024; G01S 11/06; H04B 17/11; H04B 17/318; F21V 23/00; G06N 3/08
USPC .................................................... 455/456.1
See application file for complete search history.

(56) References Cited

U.S. PATENT DOCUMENTS

| | | | |
|---|---|---|---|
| 9,584,773 B2* | 2/2017 | Chien .................... | H04L 67/18 |
| 2001/0022558 A1* | 9/2001 | Karr, Jr. ................. | G01S 1/026 |
| | | | 342/450 |
| 2004/0022214 A1* | 2/2004 | Goren ................... | G01S 5/0252 |
| | | | 370/332 |
| 2006/0217131 A1* | 9/2006 | Alizadeh-Shabdiz .... | G01S 5/02 |
| | | | 455/456.1 |
| 2009/0280827 A1* | 11/2009 | Michaud ............... | G01S 5/0252 |
| | | | 455/456.1 |
| 2013/0273938 A1* | 10/2013 | Ng ........................ | H04W 64/00 |
| | | | 455/456.1 |
| 2018/0124732 A1* | 5/2018 | Kamthe ................ | H04W 24/10 |
| 2018/0160269 A1* | 6/2018 | Baarman ................. | G01S 5/00 |

* cited by examiner

*Primary Examiner* — William Nealon
(74) *Attorney, Agent, or Firm* — Withrow & Terranova, P.L.L.C.

(57) ABSTRACT

A method of operating an indoor location services system includes providing a calibration beacon signal from a calibration device at a number of calibration locations, measuring a received signal strength of the calibration beacon signal at each one of a number of receivers for each one of the number of calibration locations, measuring a received signal strength of a beacon signal provided by a locatable device at each one of the receivers, and estimating a location of the locatable device based on the received signal strength of the beacon signal at each one of the receivers, the received signal strength of the calibration beacon signal at each one of the receivers for each one of the calibration locations, and a location of each one of the receivers.

20 Claims, 12 Drawing Sheets

INDOOR POSITIONING SYSTEM

FIELD OF THE DISCLOSURE

The present disclosure is related to systems and methods for providing indoor location services.

BACKGROUND

Several technologies exist for providing location services in an outdoor environment. These technologies include, for example, global positioning system (GPS) and global navigation satellite system (GLONASS). While these technologies are highly effective in an outdoor environment, they often fail in indoor environments. Technologies for providing location services in an indoor environment have been proposed, but often fail to provide a desired level of accuracy, do not integrate with existing consumer hardware, or are prohibitively expensive. Accordingly, there is a need for improved systems and methods for providing indoor location services.

SUMMARY

In one embodiment, a method of operating an indoor location services system includes providing a calibration beacon signal from a calibration device at a number of calibration locations, measuring a received signal strength of the calibration beacon signal at each one of a number of receivers for each one of the number of calibration locations, measuring a received signal strength of a beacon signal provided by a locatable device at each one of the receivers, and estimating a location of the locatable device based on the received signal strength of the beacon signal at each one of the receivers, the received signal strength of the calibration beacon signal at each one of the receivers for each one of the calibration locations, and a location of each one of the receivers. By using the received signal strength of the calibration beacon signal at each one of the receivers for each one of the calibration locations and the location of each one of the receivers to estimate the location of the locatable device, an accurate location of the locatable device can be determined.

In one embodiment, an indoor location services system includes an indoor location services module, a number of receivers, and a calibration device. Each one of the receivers is configured to measure a received signal strength of a calibration beacon signal and provide received signal strength measurements of the calibration beacon signal to the indoor location services module. Further, each one of the receivers is configured to measure a received signal strength of a beacon signal provided from a locatable device and provide received signal strength measurements of the beacon signal to the indoor location services module. The calibration device is configured to provide the calibration beacon signal at a number of calibration locations and provide the calibration locations to the indoor location services module. The indoor location services module is configured to estimate a location of the locatable device based on the received signal strength measurements of the beacon signal at each one of the receivers, the received signal strength measurements of the calibration beacon signal at each one of the receivers for each one of the calibration locations, and a location of each one of the receivers. By using the received signal strength of the calibration beacon signal at each one of the receivers for each one of the calibration locations and the location of each one of the receivers to estimate the location of the locatable device, an accurate location of the locatable device can be determined.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
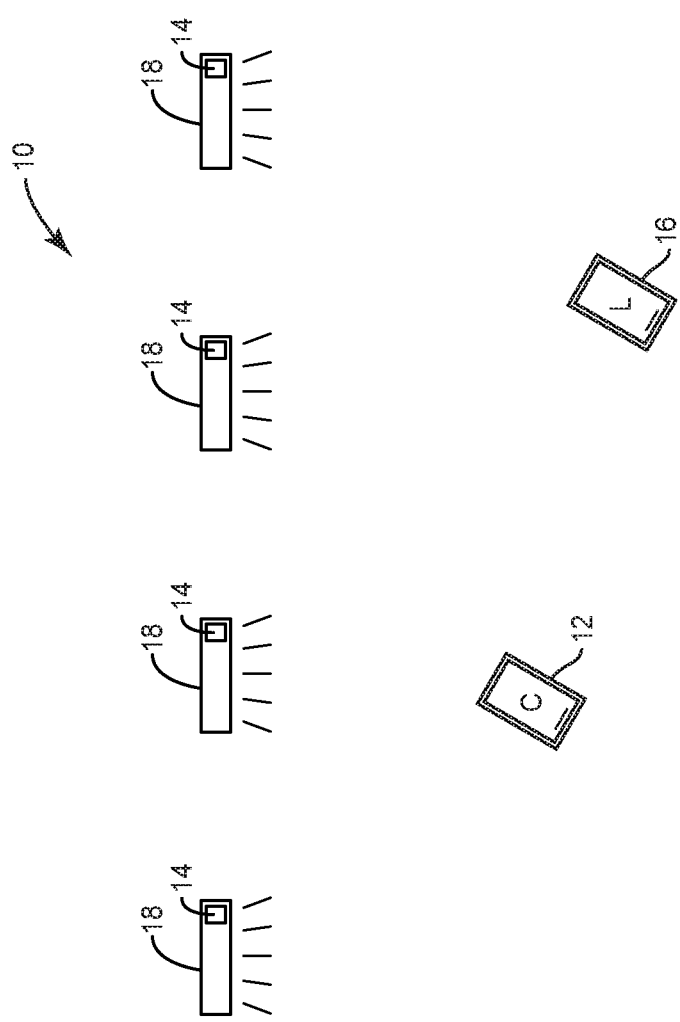
FIG. 1 illustrates an indoor location services system according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is a diagram illustrating an indoor location services system 10 according to one embodiment of the present disclosure. The indoor location services system 10 includes a calibration device 12, a number of receivers 14, and a locatable device 16. Each one of the receivers 14 may be integrated into a lighting fixture 18 as shown. In various embodiments, this may mean being collocated with the lighting fixture 18 or sharing certain functionality with the lighting fixture 18 such as power management circuitry and/or processing circuitry. Since lighting fixtures 18 are often distributed throughout an indoor environment at a relatively high density and in a regular pattern, and since lighting fixtures 18 may provide access to power and other functionality, they may provide an optimal platform for distributing receivers 14 throughout an indoor environment.

Figure 2:
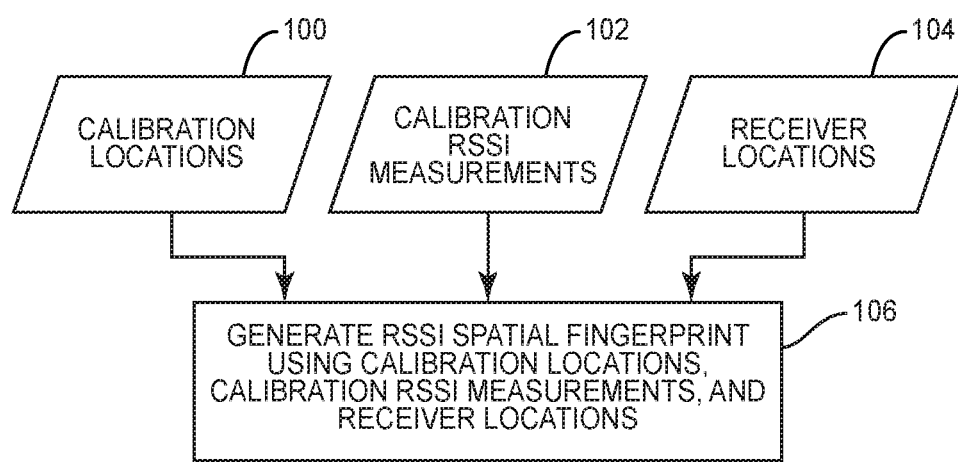
FIG. 2 illustrates a method for calibrating an indoor location services system according to one embodiment of the present disclosure.

FIG. 2 is a flow diagram illustrating a method for calibrating the indoor location services system 10 according to one embodiment of the present disclosure. The process begins with three inputs including a set of calibration locations (step 100), a set of calibration received signal strength indication (RSSI) measurements (step 102), and a set of receiver locations (step 104). Using the set of calibration locations, the set of calibration RSSI measurements, and the set of receiver locations, an RSSI spatial fingerprint is generated (step 106). As discussed in detail below, the RSSI spatial fingerprint is a relationship between the set of calibration locations, the set of calibration RSSI measurements, and the set of receiver locations that can be used to accurately estimate the location of the locatable device 16 in an indoor environment from a beacon signal provided from the locatable device 16.

Figure 3:
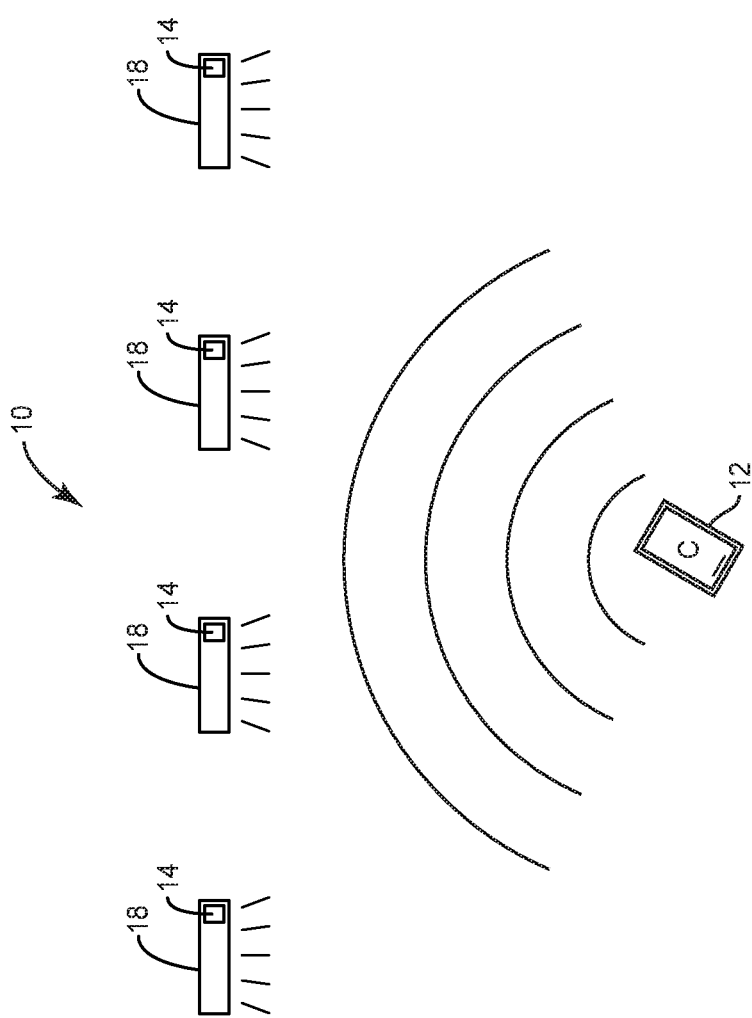
FIG. 3 illustrates how a number of calibration received signal strength indicator (RSSI) measurements may be obtained in an indoor location services system according to one embodiment of the present disclosure.

Each one of the set of calibration RSSI measurements is a measurement of RSSI of a calibration beacon signal taken by one of the receivers 14, where the calibration beacon signal is provided from the calibration device 12 at a particular calibration location of the calibration device 12. FIG. 3 is a diagram illustrating how the set of calibration RSSI measurements are obtained in the indoor location services system 10 according to one embodiment of the present disclosure. At a given calibration location of the calibration device 12, the calibration device 12 emits a calibration beacon signal. An RSSI of the calibration beacon signal is measured by each one of the receivers 14. The RSSI of the calibration beacon signal will be different for each one of the receivers 14 based on a distance of the calibration device 12 from the one of the receivers 14 and other factors such as the surrounding environment, signal reflection and interference, and the like. The RSSI of the calibration beacon signal at each one of the receivers 14 is one of the calibration RSSI measurements in the set of calibration RSSI measurements. Notably, the above process is repeated for a number of calibration locations of the calibration device 12 to form the set of calibration RSSI measurements.

The calibration device 12 may be any suitable device, such as a smartphone, tablet, or other mobile electronic device. The beacon signal may be any suitable signal, such as a Bluetooth low energy (BLE) beacon signal, for which the RSSI can be easily measured with sufficient accuracy. The locatable device 16 may also be any suitable device. In some embodiments, the locatable device 16 may be a smartphone, tablet, or other mobile electronic device. In other embodiments, the locatable device 16 may be a tag or small electronic device placed on an object to allow for location of the object.

Each one of the calibration locations in the set of calibration locations is a location of the calibration device 12 at the time the calibration beacon signal is emitted. A calibration location may be an x,y coordinate of the calibration device 12 in the indoor environment in which the indoor location services system 10 is located, or may include further spatial information such as a z coordinate and/or orientation of the calibration device 12. Any suitable method for obtaining the location of the calibration device 12 in an indoor environment may be used to obtain the set of calibration locations.

Figure 4:
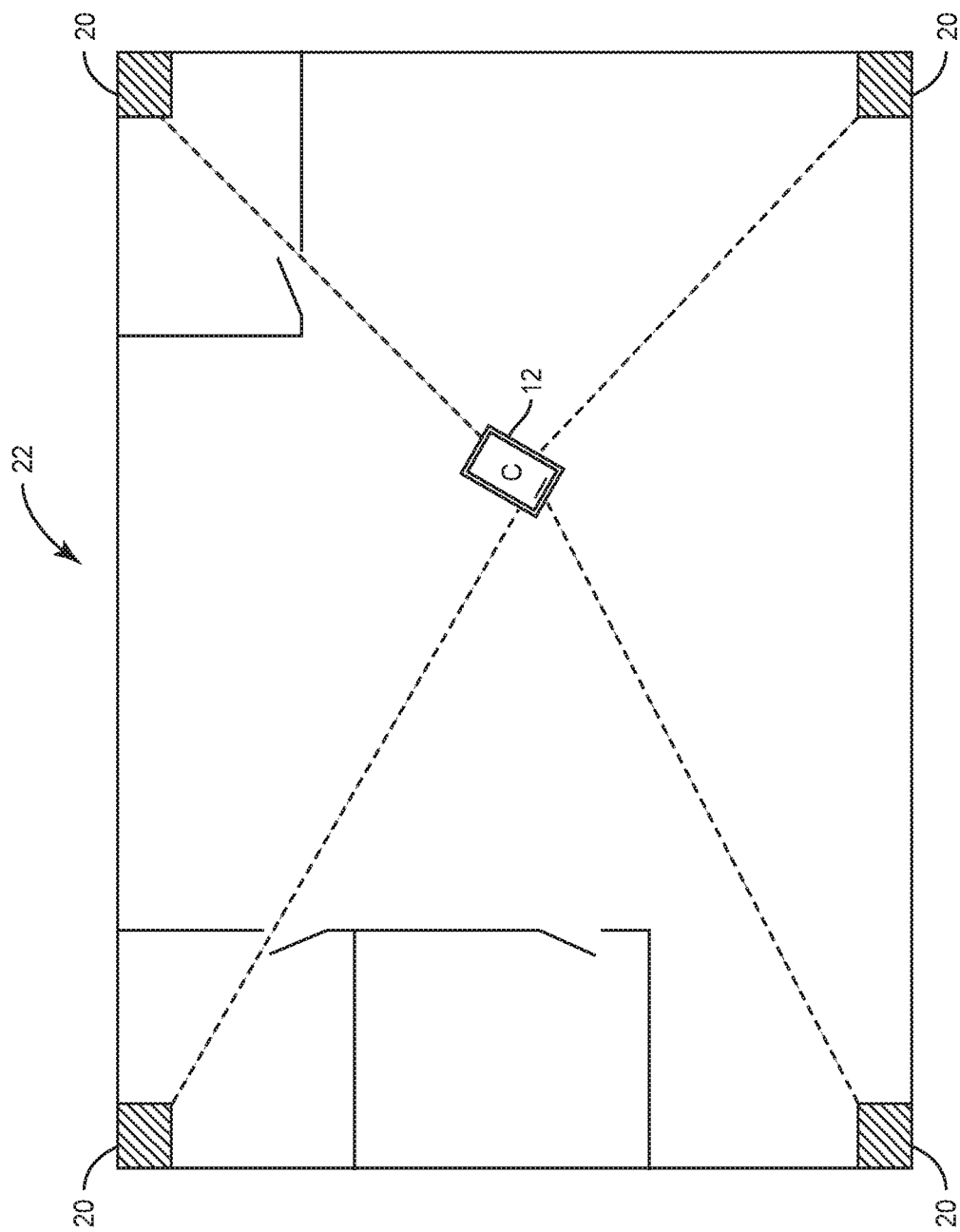
FIG. 4 illustrates how a calibration location of a calibration device may be obtained in an indoor location services system according to one embodiment of the present disclosure.

FIG. 4 is a diagram illustrating how the set of calibration locations are obtained in an indoor environment in which the indoor location services system 10 is located according to one embodiment of the present disclosure. As shown, a number of calibration location transceivers 20 are provided at or near the boundaries of an indoor environment 22 serviced by the indoor location services system 10. For example, the calibration location transceivers 20 are provided in the corners of the indoor environment 22. The calibration location transmitters 20 provide signals to the calibration device 12 that allow the calibration device 12 to determine its location within the indoor environment 22. In one exemplary embodiment, the calibration location transceivers 20 are transceivers configured to enable time of flight (TOF) and/or time delay of flight (TDOA) ranging between the calibration device 12 and the calibration location transceivers 20 to determine the location of the calibration device 12. For example, the calibration location transceivers 20 may be ultra-wideband (UWB) real time location systems (RTLS) transceivers offered by Decawave Limited of Dublin, Ireland. In general, the calibration location transmitters 20 may be transmitters that are proprietary and/or not compatible with consumer hardware. Accordingly, the calibration device 12 may include a specialized transceiver for interacting with the calibration location transceivers 20.

Using the precise distance information provided by the calibration location transceivers 20, a location of the calibration device 12 can be obtained. However, the location of the calibration device 12 may not be obtainable via simple geometry as the measurements from the calibration location transceivers 20 may not converge on a single location. Instead, an optimization approach can be used wherein a location of the calibration device 12 that minimizes an error function is found. An exemplary error function is shown in Equation (1):

$$f(x) = \sum_{n}^{T_{tcv}} \frac{\left(\sqrt{\sum_{i}^{T_{dim}} (X_i - A_{in})^2} - D_n\right)^2}{n} \quad (1)$$

where $T_{tcv}$ is the total number of calibration location transceivers 20, $T_{dim}$ is the total number of dimensions used for the location of the calibration device 12, $X_i$ is the estimated position of the calibration device 12, $A_{in}$ is the position of the $n^{th}$ one of the calibration location transceivers 20, and $D_n$ is the distance between the calibration device 12 and the $n^{th}$ one of the calibration location transceivers 20. By taking a first derivative of f(x) from Equation (1) according to Equation (2):

$$g(x) = \frac{\partial f(x)}{\partial X_i} \quad (2)$$

and graphing a two-dimensional solution of g(x) with one, two, and three calibration location transceivers 20, a minimum of the graph including three calibration location transceivers 20 indicates a unique solution. A full solution to the minimum (i.e., where Equation (2) is equal to zero) might be quite computationally expensive, so an optimization (e.g., Broyden-Fletcher-Goldfarb-Shanno, or BFGS) may be used. Specifically, the location of the calibration device 12 can then be found using the derivative f(x) as in Equation (3):

$$\frac{\partial f(x)}{\partial X_\alpha} = \sum_{n}^{T_{tcv}} -\frac{2(X_\alpha - A_{\alpha n})\left(D_n - \sqrt{\sum_{i}^{T_{dim}} (X_i - A_{in})^2}\right)}{\sqrt{\sum_{i}^{T_{dim}} (X_i - A_{in})^2}} \quad (3)$$

Notably, the use of calibration location transceivers 20 for determining the location of the calibration device 12 and thus the set of calibration locations is merely exemplary. Any suitable method for determining the location of the calibration device 12 may be used without departing from the principles of the present disclosure.

With reference to FIGS. 1-4 discussed above, the indoor location services system 10 may be calibrated by providing a calibration beacon signal from the calibration device 12 at a number of calibration locations within the indoor environment 22 serviced by the indoor location services system 10. Every time a calibration beacon signal is provided from the calibration device 12, a calibration RSSI measurement is taken by each one of the receivers 14. An accurate relationship between the location of the calibration device 12 and the RSSI of the calibration beacon signal provided thereby at each one of the receivers 14 can then be obtained, and is referred to herein as an RSSI spatial fingerprint. This RSSI spatial fingerprint can be used to determine the location of the locatable device 16 based on a beacon signal provided from the locatable device 16. In various embodiments, the RSSI spatial fingerprint may be a set of training inputs for a neural network including the set of calibration locations, the set of calibration RSSI measurements, and the set of receiver locations. Further, the RSSI spatial fingerprint may be a set of training inputs for a neural network including only a portion of the set of calibration locations, the set of calibration RSSI measurements, and the receiver locations. The remaining portions of the set of calibration locations and the set of calibration RSSI measurements may be used as verification inputs to the neural network.

Figure 5:
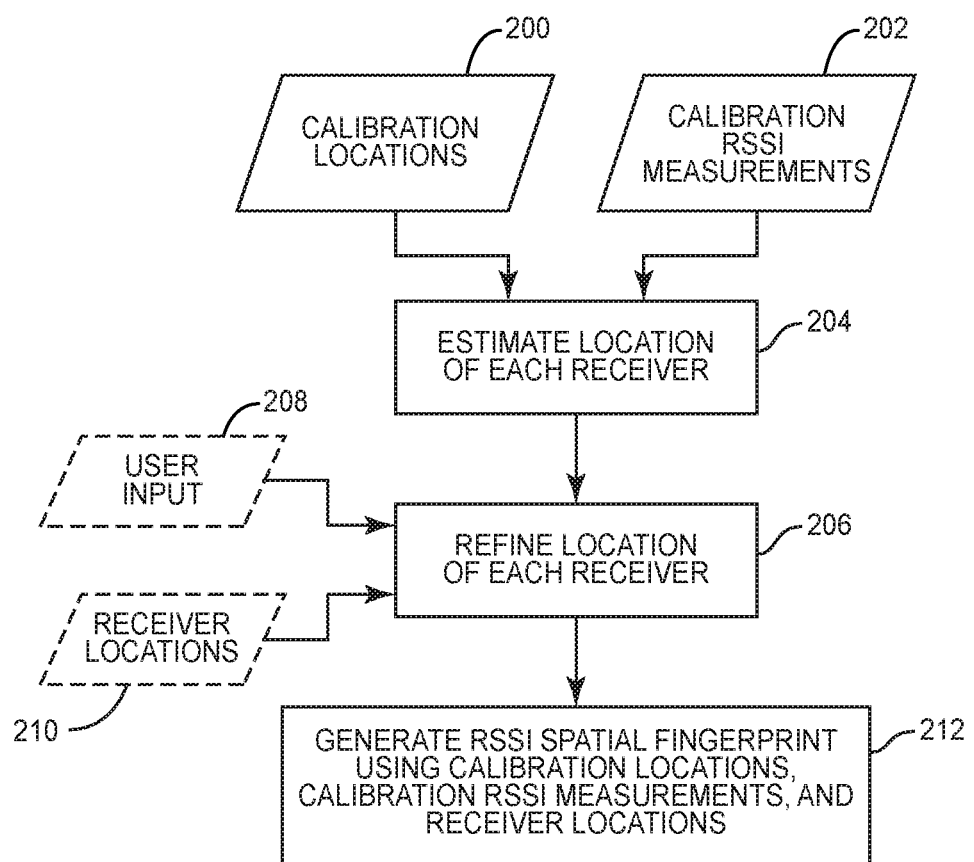
FIG. 5 illustrates a method for calibrating an indoor location services system according to one embodiment of the present disclosure.

The set of receiver locations may be known ahead of time (i.e., provided to the indoor location services system 10) or determined based on the set of calibration locations and the set of calibration RSSI measurements. Accordingly, FIG. 5 is a flow diagram illustrating a method for calibrating the indoor location services system 10 according to an additional embodiment of the present disclosure in which the set of receiver locations is determined based on the set of calibration locations and the set of calibration RSSI measurements. The process begins once again with a set of calibration locations (step 200) and a set of calibration RSSI measurements (202), which may be obtained as discussed above. A location of each one of the receivers 14 is then estimated from the set of calibration locations and the set of calibration RSSI measurements (step 204). This estimation may occur with reference to the free space path loss of the calibration beacon signal at multiple calibration locations with respect to a particular receiver 14. The free space path loss of a signal is defined according to Equations (4) through (6):

$$RSSI = -10 * n * \log_{10}(d) + C + Noise \quad (4)$$

$$d = \sqrt{(x_{rcv} - x_{clb})^2 + (y_{rcv} - y_{clb})^2 + (z_{rcv} - z_{clb})^2} \quad (5)$$

$$Noise = N(\mu, \sigma^2) \quad (6)$$

where n is the propagation factor of the calibration beacon signal, C is a calibration constant equal to an RSSI of the calibration beacon signal at a distance of one meter (~60 dB in one embodiment), $x_{rcv}, y_{rcv}, z_{rcv}$ are the coordinates of the position of the receiver 14, $x_{clb}, y_{clb}, z_{clb}$ are the coordinates of the position of the calibration device 12, $\mu=0$, and $\sigma$ is the standard deviation. The value of n, C, Noise, and $x_{clb}, y_{clb}, z_{clb}$ are known. With $z_{rcv}$ fixed at a particular value (e.g., 1.5 m or around the height the calibration device 12 will be held during calibration) values for $x_{rcv}$ and $y_{rcv}$ can be found using a curve fit. The values for $x_{rcv}$ and $y_{rcv}$ are the estimated position of the receiver 14.

The estimated location of each receiver 14 may then be refined (step 206) based on user input (step 208) and/or a set of receiver locations (step 210). In one exemplary embodiment, a graphical user interface is presented to a user showing an estimated location of each one of the receivers 14. A user may then refine a location of each one of the receivers 14 to accurately reflect the actual location thereof. In another exemplary embodiment, a set of receiver locations is provided to the indoor location services system 10. The set of receiver locations may be obtained, for example, from building plans or the like. The set of receiver locations may indicate a location at which a receiver 14 is expected to be located. This may be derived from a location of lighting fixtures 18, which, as discussed above, the receivers 14 may be integrated into. With knowledge of where receivers 14 should be located in a space, the estimated location of each receiver 14 may be refined.

In an embodiment in which locations where receivers 14 are known ahead of time, but the actual location of any one of the receivers 14 is not known, the set of known receiver locations G is expressed according to Equation (7):

$$G=\{G_1, G_2, \ldots, G_n\} \quad (7)$$

a set of estimated receiver locations L obtained above is expressed according to Equation (8):

$$F=\{F_1, F_2, \ldots, F_m\} \quad (8)$$

Each one of the set of receiver locations $G_i$ and each one of the set of estimated receiver locations $L_j$ are three dimensional coordinates as expressed in Equation (9):

$$G_i = [x, y, z]_i \quad (9)$$
$$F_j = [x, y, z]_j$$

A cost function is defined as the Euclidian distance of L2 norm as in Equation (10):

$$D_{mn} = \sqrt{\sum_{i=x,y,z} (G_{mi} - F_{ni})^2} \quad (10)$$

For each permutation of $G_i$ in $F_j$, the cost function is calculated and the lowest cost for the whole system is found. This requires testing P(n, m)*m distance costs, where P(n, m) is defined according to Equation (11):

$$P(n, m) = \frac{n!}{(n-m)!} \quad (11)$$

Such an approach quickly diverges and may be unobtainable with normal computing power.

An optimization to the above approach may be provided as follows. First, a complete cost matrix is computed for each receiver location G, and each estimated receiver location $F_j$ combination. For example, if $G_i$ is provided as:

| i | x | y | z |
|---|---|---|---|
| 1 | 5.00 | 5.00 | 3.00 |
| 2 | 5.00 | 10.00 | 3.00 |
| 3 | 10.00 | 5.00 | 3.00 |
| 4 | 10.00 | 10.00 | 3.00 |
| 5 | 15.00 | 5.00 | 3.00 | and $F_j$ is provided as:

| j | x [m] | y [m] | z [m] |
|---|---|---|---|
| 1 | 4.00 | 4.00 | 3.00 |
| 2 | 6.00 | 6.00 | 3.00 |
| 3 | 9.00 | 4.00 | 3.00 |
| 4 | 11.00 | 9.00 | 3.00 | a complete cost matrix may be calculated using Equation (1) for each cell as:

|  | j = 1 | j = 2 | j = 3 | j = 4 |
|---|---|---|---|---|
| i = 1 | 1.41 | 1.41 | 4.12 | 7.21 |
| i = 2 | 6.08 | 4.12 | 7.21 | 6.08 |
| i = 3 | 6.08 | 4.12 | 1.41 | 4.12 |
| i = 4 | 8.49 | 5.66 | 6.08 | 1.41 |
| i = 5 | 11.05 | 9.06 | 6.08 | 5.66 |

For each column in the complete cost matrix, the lowest row is chosen. This effectively picks for each the closest receiver location $G_i$ for each estimated receiver location $F_j$. The results for this are [1,1,3,4], which means that only estimated receiver locations $F_3$ and $F_4$ uniquely correspond with receiver locations $G_3$ and $G_4$, respectively. Both estimated receiver locations $F_1$ and $F_2$ correspond with receiver location $G_1$. Any estimated receiver locations $F_j$ for which the aforementioned process provided the same correlated receiver location $G_i$ are grouped. For example, estimated receiver locations $F_1$ and $F_2$ are added to a group with receiver location $G_1$ to provide group $RG_1=(F_1, F_2, G_1)$. The next closest receiver location $G_i$ for each estimated receiver location $F_j$ in the group is then added to the group. For example, the next closest receiver location $G_i$ to both estimated receiver locations $F_1$ and $F_2$ is receiver location $G_2$, so receiver location $G_2$ is added to the group $RG_1=(F_1, F_2, G_1, G_2)$. Now the cost matrix is calculated for all permutations of $RG_1$. Following the current example, the cost matrix is calculated as:

| $(F_1, G_1), (F_2, G_2)$ | $(F_1, G_2), (F_2, G_1)$. |
|---|---|
| 5.537 | 7.50 |

Since column 1 provides the lowest cost, this means that estimated receiver location $F_1$ is correlated with receiver location $G_1$ and estimated receiver location $F_2$ is correlated with receiver location $G_2$. In this way, the estimated receiver locations $F_j$ can be refined using a set of known receiver locations $G_i$.

Finally, an RSSI spatial fingerprint may be generated using the calibration locations, the calibration RSSI measurements, and the receiver locations (step 212). This may be accomplished as discussed above. A neural network may be trained using the RSSI spatial fingerprint including the calibration locations, the calibration RSSI measurements, and the receiver locations obtained as discussed above such that the neural network is capable of accurately estimating a location of the locatable device 16 based on an RSSI of a beacon signal provided from the locatable device 16 measured at each one of the receivers 14. In one embodiment, the neural network may be pre-trained using virtualized data obtained according to Equation (4) above. The value of n, C, and Noise are known. Further, the location of each receiver 14 and thus their coordinates $x_{rcv}$, $y_{rcv}$, $z_{rcv}$ are known. Using a virtualized calibration location with coordinates $x_{clb}$, $y_{clb}$, $z_{clb}$, a virtualized RSSI value can be calculated. This estimated value for the RSSI at a given calibration location $x_{clb}$, $y_{clb}$, $z_{clb}$ can be used to pre-train the neural network. While this data will not be as accurate as that obtained through the calibration process discussed above, it may nonetheless significantly increase the amount of training data for the neural network and thus the accuracy thereof.

Figure 6:
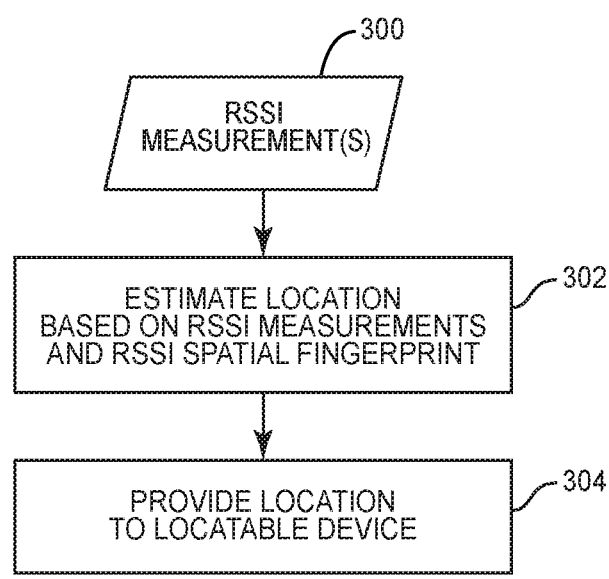
FIG. 6 illustrates a method for locating a locatable device in an indoor location services system according to one embodiment of the present disclosure.

FIG. 6 is a flow diagram illustrating a method for determining a location of the locatable device 16 in the indoor location services system 10 according to one embodiment of the present disclosure. The process begins with one or more RSSI measurements (step 300) of a beacon signal provided from the locatable device 16. The one or more RSSI measurements are taken at each one of the receivers 14. Based on the one or more RSSI measurements and the RSSI spatial fingerprint discussed above, a location of the locatable device 16 can be estimated (step 302). As discussed above, this may involve providing the one or more RSSI measurements to a neural network that was trained using the RSSI spatial fingerprint, or trained using a portion of the RSSI fingerprint and verified using a remaining portion of the RSSI fingerprint. Finally, the estimated location may be provided back to the locatable device 16 (step 304). This may enable certain applications on the locatable device 16, such as indoor navigation applications.

Figure 7:
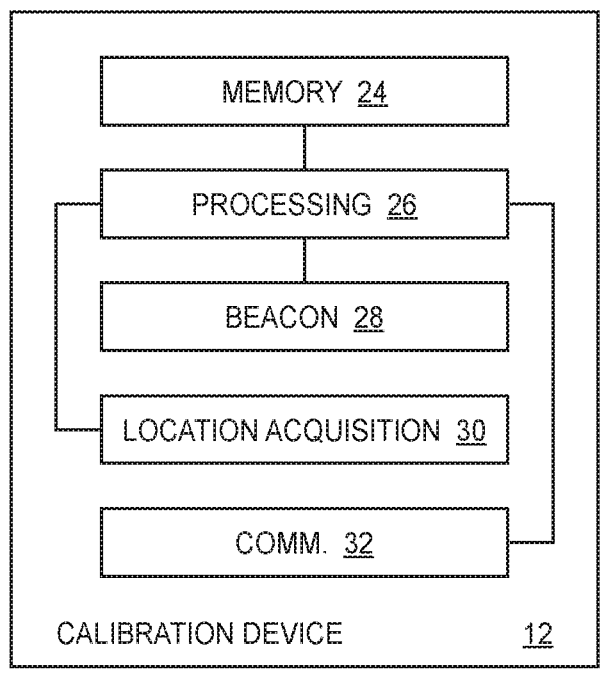
FIG. 7 illustrates a calibration device for an indoor location services system according to one embodiment of the present disclosure.

FIG. 7 is a diagram showing details of the calibration device 12 according to one embodiment of the present disclosure. The calibration device 12 includes a memory 24, processing circuitry 26, beacon signal transmission circuitry 28, location acquisition circuitry 30, and communications circuitry 32. The processing circuitry 26 is coupled to the memory 24, the beacon signal transmission circuitry 28, the location acquisition circuitry 30, and the communications circuitry 32. The memory 24 stores instructions, which, when executed by the processing circuitry 26 cause the calibration device 12 to perform the functionality discussed above in order to calibrate the indoor location services system 10. The beacon signal transmission circuitry 28 is configured to transmit a configuration beacon signal in response to instructions from the processing circuitry 26. The location acquisition circuitry 30 is configured to determine a location of the calibration device 12 in response from instructions from the processing circuitry 26. The communications circuitry 32 enables the calibration device 12 to communicate with one or more other devices.

Figure 8:
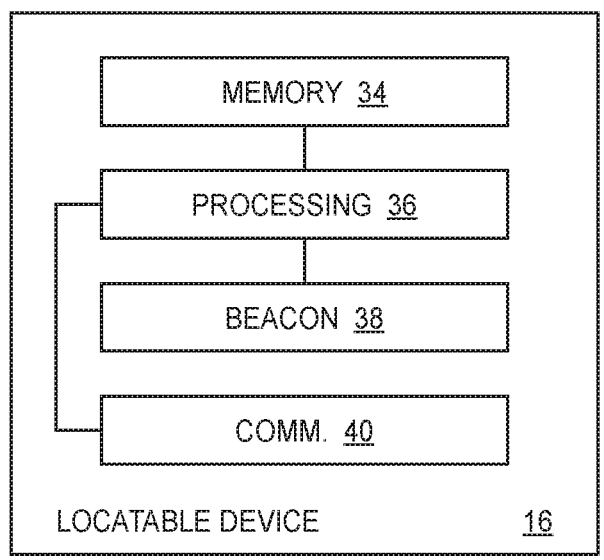
FIG. 8 illustrates a locatable device for an indoor location services system according to one embodiment of the present disclosure.

FIG. 8 is a diagram showing details of the locatable device 16 according to one embodiment of the present disclosure. The locatable device 16 includes a memory 34, processing circuitry 36, beacon signal transmission circuitry 38, and communications circuitry 40. The processing circuitry 36 is coupled to the memory 34, the beacon transmission circuitry 38, and the communications circuitry 40. The memory 34 stores instructions, which, when executed by the processing circuitry 36, cause the locatable device 16 to perform the functionality discussed above in order to locate the locatable device 16 in the indoor location services system 10. The beacon transmission circuitry 38 is configured to transmit a beacon signal in response to instructions from the processing circuitry 36. The communications circuitry 40 enables the locatable device 16 to communicate with one or more other devices.

Figure 9:
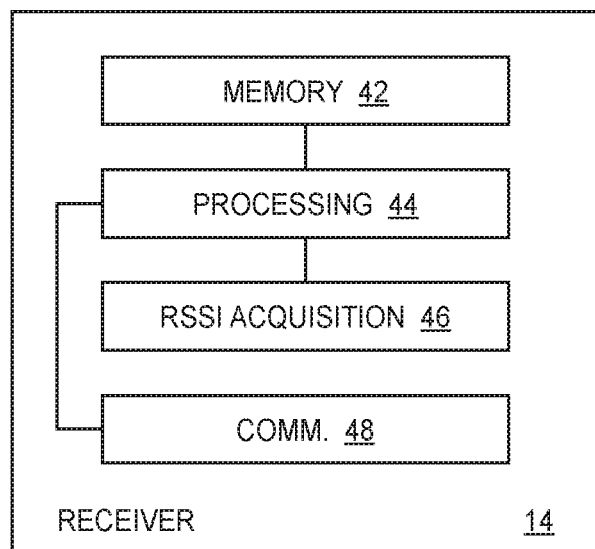
FIG. 9 illustrates a receiver for an indoor location services system according to one embodiment of the present disclosure.

FIG. 9 is a diagram showing details of a receiver 14 according to one embodiment of the present disclosure. The receiver 14 includes a memory 42, processing circuitry 44, RSSI acquisition circuitry 46, and communications circuitry 48. The processing circuitry 44 is coupled to the memory 42, the RSSI acquisition circuitry 46, and the communications circuitry 48. The memory 42 includes instructions, which, when executed by the processing circuitry 44, cause the receiver 14 to perform the functionality described above in order to calibrate the indoor location services system 10 and locate the locatable device 16 in the indoor location services system 10. The RSSI acquisition circuitry 46 is configured to measure an RSSI of a beacon signal in response to instructions from the processing circuitry 44. The communications circuitry 46 enables the receiver 14 to communicate with one or more other devices.

Figure 10:
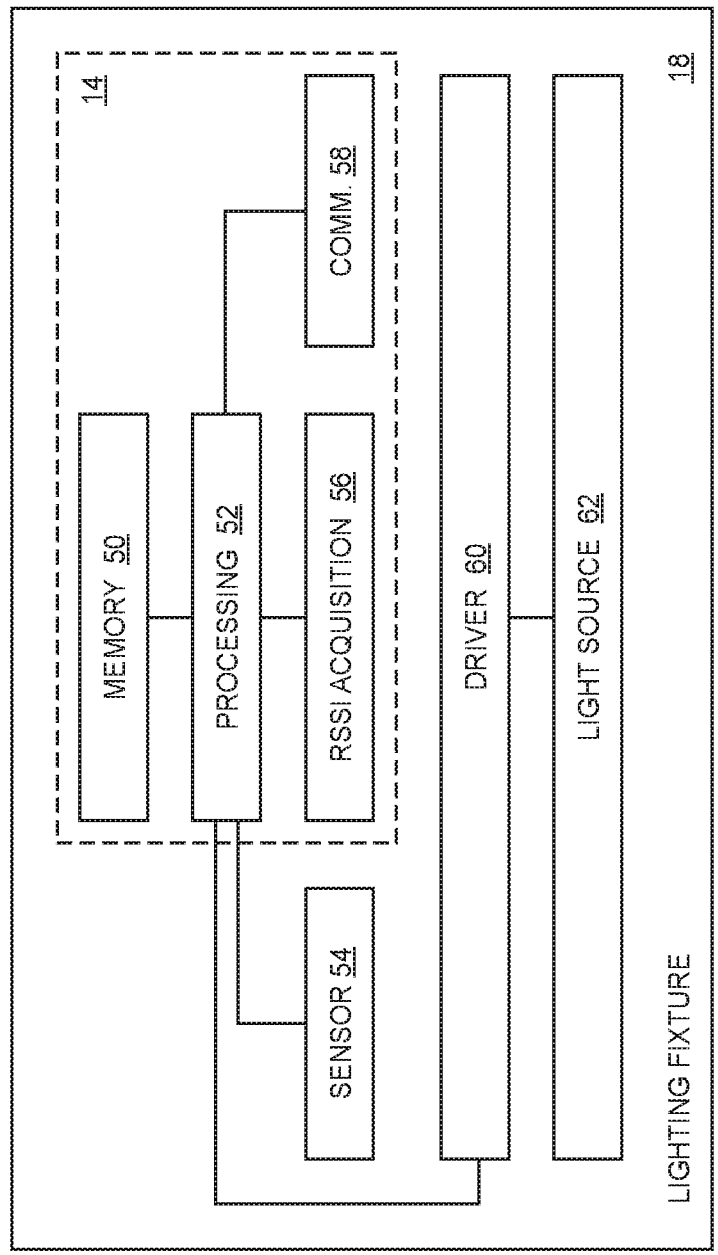
FIG. 10 illustrates a lighting fixture including a receiver for an indoor location services system according to one embodiment of the present disclosure.

As discussed above, the receiver 14 may be integrated into a lighting fixture 18. FIG. 10 is a diagram showing details of a lighting fixture 18 including a receiver 14 according to one embodiment of the present disclosure. The lighting fixture 18 includes a memory 50, processing circuitry 52, sensor circuitry 54, RSSI acquisition circuitry 56, communications circuitry 58, driver circuitry 60, and a light source 62. The processing circuitry 52 is coupled to the memory 50, the sensor circuitry 54, the RSSI acquisition circuitry 56, the communications circuitry 58, and the driver circuitry 60. The driver circuitry 60 is coupled to the light source 62. The memory 50 stores instructions, which, when executed by the processing circuitry 52 cause the lighting fixture 18 to provide light suitable for general illumination from the light source 62 and adjust one or more light output parameters of the light provided from the light source 62 based on user instructions received via the communications circuitry 58 and/or sensor data from the sensor circuitry 54. Further, the memory 50 includes instructions, which, when executed by the processing circuitry 52 cause the lighting fixture 18 to perform the functionality described above in order to calibrate the indoor location services system 10 and locate the locatable device 16 in the indoor location services system 10. The sensor circuitry 54 is configured to measure one or more environmental conditions and provide sensor data to the processing circuitry 52. The RSSI acquisition circuitry 56 is configured to measure an RSSI of a beacon signal in response to instructions from the processing circuitry 52. The communications circuitry 58 enables the lighting fixture 18 to communicate with one or more other devices. The driver circuitry 60 provides signals suitable to produce a desired light output from the light source 62 based on instructions from the processing circuitry 52.

Notably, the above described calibration device 12, receiver 14, locatable device 16, and lighting fixture 18 are merely exemplary. Those skilled in the art will understand that the functionality of these devices described herein may be accomplished using myriad hardware, all of which is contemplated herein.

Figure 11:
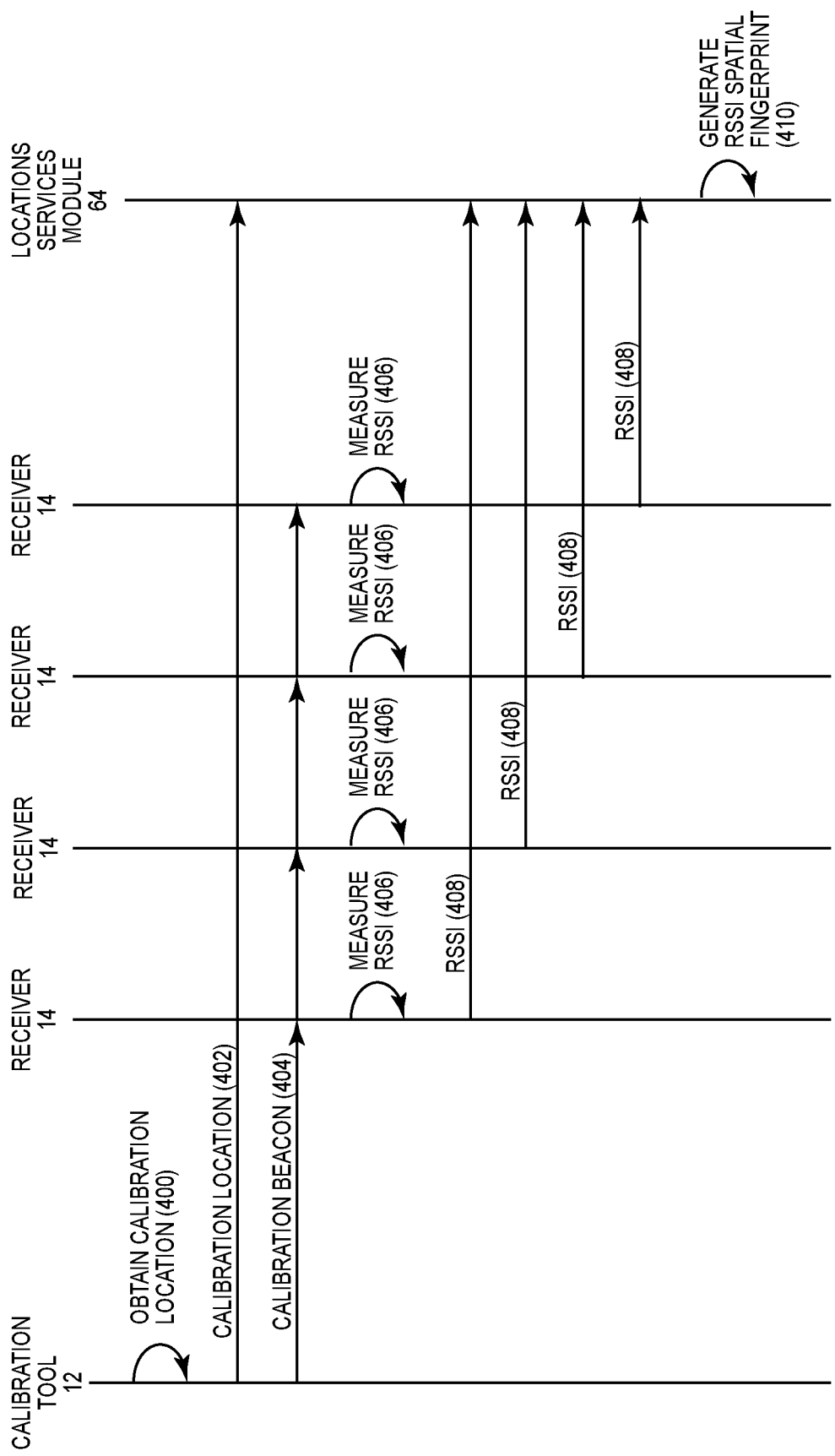
FIG. 11 illustrates a communication flow for calibrating an indoor location services system according to one embodiment of the present disclosure.

FIG. 11 is a call flow diagram illustrating a communication flow for calibrating the indoor location services system 10 according to one embodiment of the present disclosure. First, the calibration device 12 obtains a calibration location for itself (step 400). As discussed above, this may involve using specialized configuration location transceivers 20, or may be accomplished in any other suitable manner. The calibration location of the calibration device 12 is then sent to a location services module 64 (step 402). In one embodiment, the location services module 64 may be a discrete device such as a server or computing system separate from the other devices in the indoor location services system 10 discussed above. In other embodiments, the functionality of the location services module 64 may be provided in whole or in part in the calibration device 12, one or more receivers 14, the locatable device 16, or one or more lighting fixtures 18. In certain embodiments, the functionality of the location services module 64 may be provided via distributed computing by several of the aforementioned devices in the indoor location services system 10.

Next, a calibration beacon signal is transmitted from the calibration device 10 (step 404). The calibration beacon signal is received at each one of the receivers 14 to a different extent. An RSSI of the calibration beacon signal is measured at each one of the receivers 14 (step 406). The measured RSSI from each one of the receivers 14 is then sent to the location services module 64 (step 408). Notably, the calibration device 12 is moved to several different calibration locations and steps 400 through 408 are repeated a number of times so that the location services module 64 has RSSI measurements of the calibration beacon signal at a number of calibration locations. Calibrating the indoor location services system 10 using a large number of RSSI measurements of the calibration beacon signal at a large number of calibration locations may provide a high degree of accuracy. Finally, the location services module 64 generates the RSSI spatial fingerprint as discussed above (step 410). Reiterating the above, this may include training a neural network using the RSSI measurements of the calibration beacon signal, the calibration locations, and the locations of the receivers, which may be known by the location services module 64 or determined by the location services module 64 from the RSSI measurements of the calibration beacon signal and the calibration locations as discussed above.

Notably, the communication flow illustrated in FIG. 11 is merely exemplary. There are nearly endless ways to accomplish the functionality of the indoor location services system 10 discussed above, all of which are contemplated herein.

Figure 12:
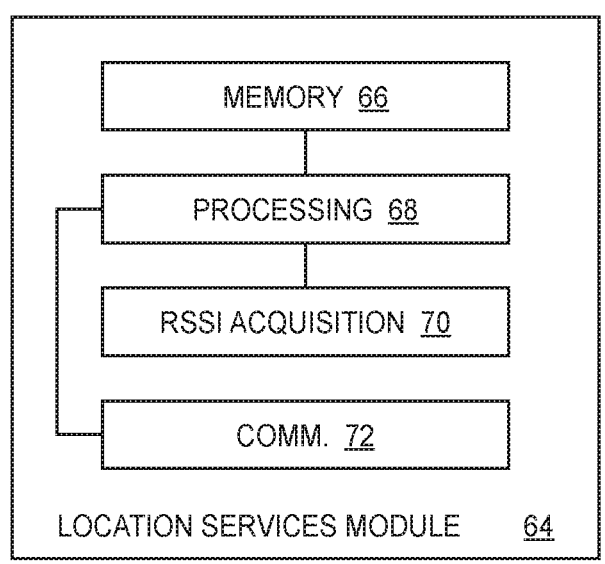
FIG. 12 illustrates a locations services module for an indoor location services system according to one embodiment of the present disclosure.

FIG. 12 is a diagram illustrating details of the location services module 64 according to one embodiment of the present disclosure. The location services module 64 includes a memory 66, processing circuitry 68, RSSI fingerprinting circuitry 70, and communications circuitry 72. The processing circuitry is coupled to the memory 66, the RSSI fingerprinting circuitry 70, and the communications circuitry 72. The memory 66 stores instructions, which, when executed by the processing circuitry 68, cause the location services module 64 to perform the functionality discussed above in order to calibrate the indoor location services system 10 and locate the locatable device 16 in the indoor location services system 10. The RSSI fingerprinting circuitry 70 is configured to generate the RSSI spatial fingerprint as discussed above in response to instructions from the processing circuitry 68. The communications circuitry 72 enables the location services module 64 to communicate with one or more other devices.

Figure 13:
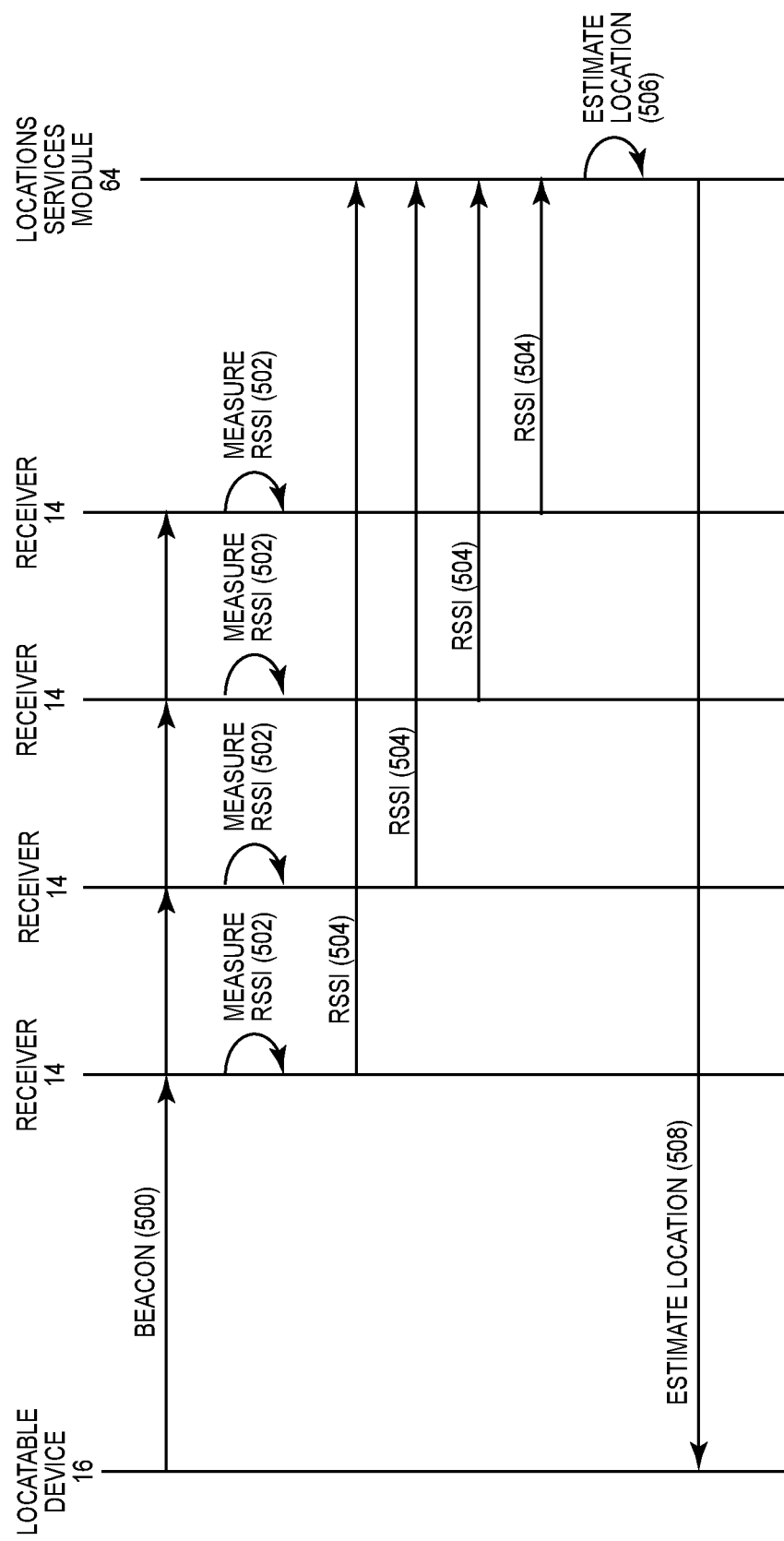
FIG. 13 illustrates a communication flow for finding a locatable device in an indoor location services system according to one embodiment of the present disclosure.

FIG. 13 is a call flow diagram illustrating a communication flow for locating the locatable device 16 in the indoor location services system 10 according to one embodiment of the present disclosure. The following process assumes that the indoor location services system 10 has already been calibrated as discussed above. First, the locatable device 16 provides a beacon signal (step 500). The beacon signal is received to a different degree by each one of the receivers 14. An RSSI of the beacon signal is measured at each one of the receivers 14 (step 502). The measured RSSI from each one of the receivers 14 is then sent to the location services module 64 (step 504). Notably, each one of the receivers 14 may take multiple measurements of the RSSI of the beacon signal from the locatable device 16, all of which may be provided to the location services module 64. The location services module 64 uses the RSSI of the beacon signal measured at each of the receivers 14 along with the RSSI spatial fingerprint discussed above to estimate a location of the locatable device 16 (step 506). The estimated location of the locatable device 16 may be transmitted back to the locatable device 16 in some embodiments (step 508).

First calibrating the indoor location services system 10 to obtain the RSSI spatial fingerprint then using the RSSI spatial fingerprint to locate the locatable device 16 allows the indoor location services system 10 to obtain a highly accurate location of the locatable device 16. This may be useful in several applications, such as asset tracking (in which the locatable device 16 is attached to an object that is desired to be tracked), people tracking (in which the locatable device 16 is located in a badge or integrated into a mobile electronic device carried by the person), or for indoor navigation. Since the beacon signals discussed herein may be BLE beacon signals that can be provided by a very large number of consumer devices, the indoor location services system 10 may be compatible with a large number of existing devices and thus be easily adoptable.

The methods for obtaining the location of the locatable device 16 discussed herein may be accomplished by way of a non-transitory computer readable medium containing instructions, which, when executed by a computer cause the computer to perform the steps discussed above. In particular, a non-transient computer readable medium may include instructions, which, when executed by a computer cause the computer to instruct the calibration device 12 to provide a calibration signal at the plurality of calibration locations, instruct the plurality of receivers 14 to measure a received signal strength of the calibration beacon signal for each one of the plurality of calibration locations, instruct the plurality of receivers 14 to measure a received signal strength of a beacon signal provided by the locatable device 16, and estimate a location of the locatable device 16 based on the received signal strength of the beacon signal at each one of the plurality of receivers, the received signal strength of the calibration beacon signal at each one of the plurality of receivers for each one of the plurality of calibration locations, and a location of each one of the plurality of receivers. Further details of the methods discussed above may be accomplished in the same manner.

Those skilled in the art will recognize improvements and modifications to the preferred embodiments of the present disclosure. All such improvements and modifications are considered within the scope of the concepts disclosed herein and the claims that follow.

What is claimed is:

1. A method comprising:
    providing a calibration beacon signal from a calibration device at a plurality of calibration locations;
    measuring a received signal strength of the calibration beacon signal at each one of a plurality of receivers for each one of the plurality of calibration locations;
    measuring a received signal strength of a beacon signal provided by a locatable device at each one of the plurality of receivers; and estimating a location of the locatable device based on the received signal strength of the beacon signal at each one of the plurality of receivers, the received signal strength of the calibration beacon signal at each one of the plurality of receivers for each one of the plurality of calibration locations, and a location of each one of the plurality of receivers, wherein each one of the plurality of receivers is integrated in a different one of a plurality of lighting fixtures.

2. The method of claim 1 further comprising estimating the location of each one of the plurality of receivers based on the received signal strength of the calibration beacon signal at each one of the plurality of receivers for each one of the calibration locations.

3. The method of claim 2 further comprising refining the estimated location of each one of the plurality of receivers based on a set of known receiver locations.

4. The method of claim 3 further comprising refining the estimated location of each one of the plurality of receivers based on user input.

5. The method of claim 2 further comprising refining the estimated location of each one of the plurality of receivers based on user input.

6. The method of claim 1 wherein the calibration beacon signal and the beacon signal are Bluetooth low energy (BLE) signals.

7. The method of claim 1 wherein estimating the location of the locatable device comprises:
training a neural network using the received signal strength of the calibration beacon signal at each one of the plurality of receivers for each one of the calibration locations and the location of each one of the plurality of receivers; and
providing the received signal strength of the beacon signal at each one of the plurality of receivers to the neural network to obtain an estimated location of the locatable device.

8. The method of claim 7 further comprising estimating the location of each one of the plurality of receivers based on the received signal strength of the calibration beacon signal at each one of the plurality of receivers for each one of the calibration locations.

9. The method of claim 1 further comprising obtaining the plurality of calibration locations at the calibration device.

10. An indoor location services system comprising:
an indoor location services module;
a plurality of lighting fixtures each comprising a receiver, the receiver configured to:
measure a received signal strength of a calibration beacon signal and provide received signal strength measurements of the calibration beacon signal to the indoor location services module; and
measure a received signal strength of a beacon signal provided from a locatable device and provide received signal strength measurements of the beacon signal to the indoor location services module; and
a calibration device configured to provide the calibration beacon signal at a plurality of calibration locations and provide the plurality of calibration locations to the indoor location services module, wherein the indoor location services module is configured to estimate a location of the locatable device based on the received signal strength measurements of the beacon signal at each receiver, the received signal strength measurements of the calibration beacon signal at each receiver for each one of the plurality of calibration locations, and a location of each one of the receivers.

11. The indoor location services system of claim 10 wherein the indoor location services module is further configured to estimate a location of each receiver based on the received signal strength measurements of the calibration beacon signal at each receiver for each one of the calibration beacon signals.

12. The indoor location services system of claim 11 wherein the indoor location services module is further configured to refine the estimated location of each receiver based on a set of known receiver locations.

13. The indoor location services system of claim 12 wherein the indoor location services module is further configured to refine the estimated location of each receiver based on user input.

14. The indoor location services system of claim 11 wherein the indoor location services module is further configured to refine the estimated location of each receiver based on user input.

15. The indoor location services system of claim 10 wherein the calibration beacon signal and the beacon signal are Bluetooth low energy (BLE) signals.

16. The indoor location services system of claim 10 wherein the indoor location services module is a distributed system in each one of the plurality of lighting fixtures.

17. The indoor location services system of claim 10 wherein estimating the location of the locatable device comprises:
training a neural network using the received signal strength measurements of the calibration beacon signal at each receiver for each one of the calibration locations and the location of each receiver; and
providing the received signal strength measurements of the beacon signal at each receiver to the neural network to obtain an estimated location of the locatable device.

18. The method of claim 17 further comprising estimating the location of each receiver based on the received signal strength measurements of the calibration beacon signal at each receiver for each one of the calibration locations.

19. The method of claim 10 wherein the calibration device is further configured to obtain the plurality of calibration locations.

20. A non-transient computer readable medium containing instructions, which, when executed by a computer cause the computer to:
instruct a calibration device to provide a calibration signal at a plurality of calibration locations;
instruct a plurality of receivers to measure a received signal strength of the calibration beacon signal for each one of the plurality of calibration locations;
instruct the plurality of receivers to measure a received signal strength of a beacon signal provided by a locatable device; and
estimate a location of the locatable device based on the received signal strength of the beacon signal at each one of the plurality of receivers, the received signal strength of the calibration beacon signal at each one of the plurality of receivers for each one of the plurality of calibration locations, and a location of each one of the plurality of receivers, wherein each one of the plurality of receivers is integrated in a different one of a plurality of lighting fixtures.

* * * * *